I. H. VENN.
VALVE CONTROLLING DEVICE.
APPLICATION FILED MAR. 21, 1905.
979,725.
Patented Dec. 27, 1910.
3 SHEETS—SHEET 1.
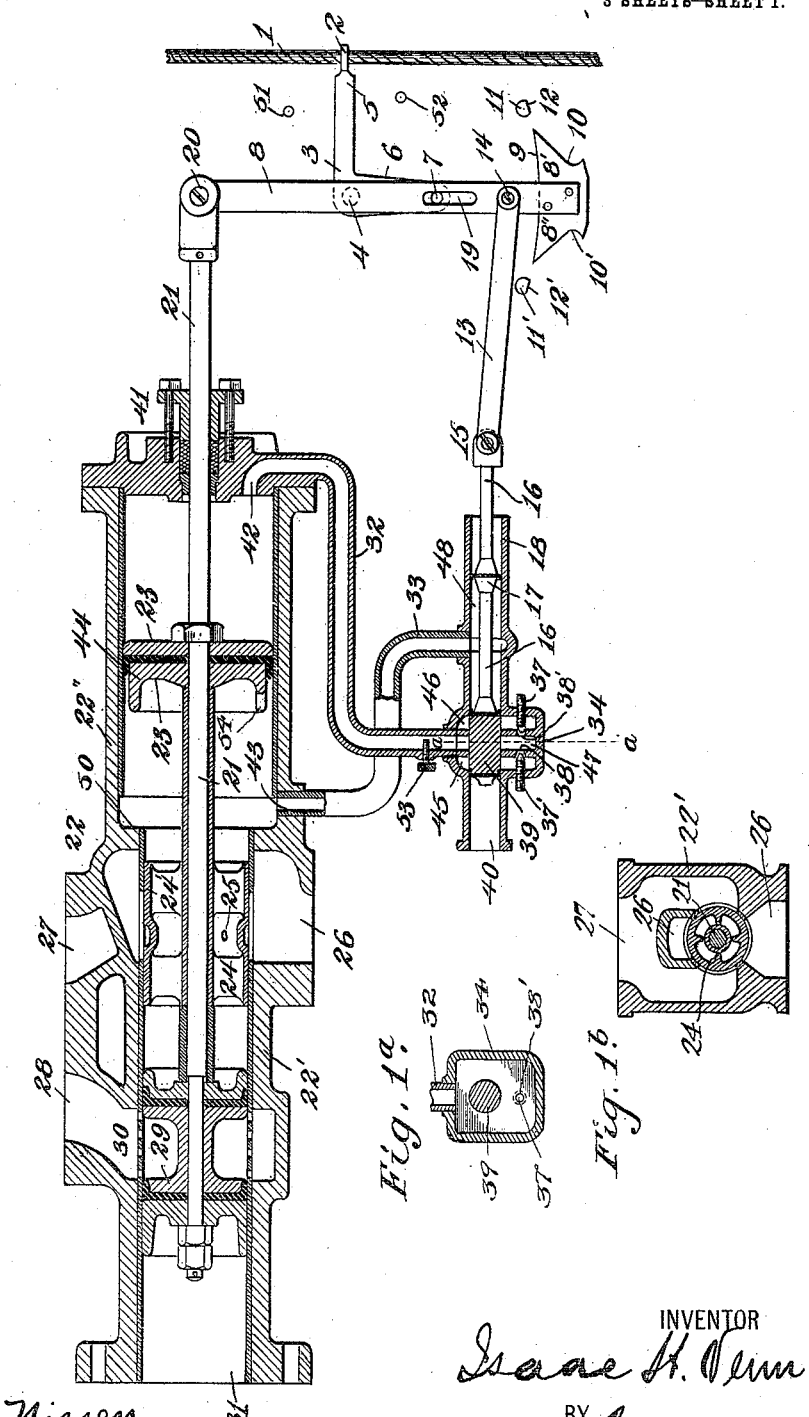
WITNESSES:
Charles M. Nissen
Walter C. Strang
INVENTOR
Isaac H. Venn
BY
Brown & Darby
ATTORNEYS

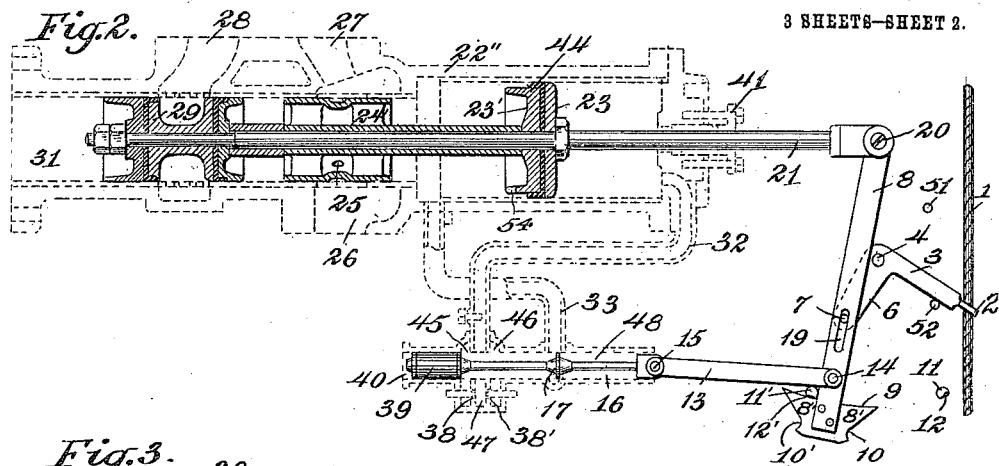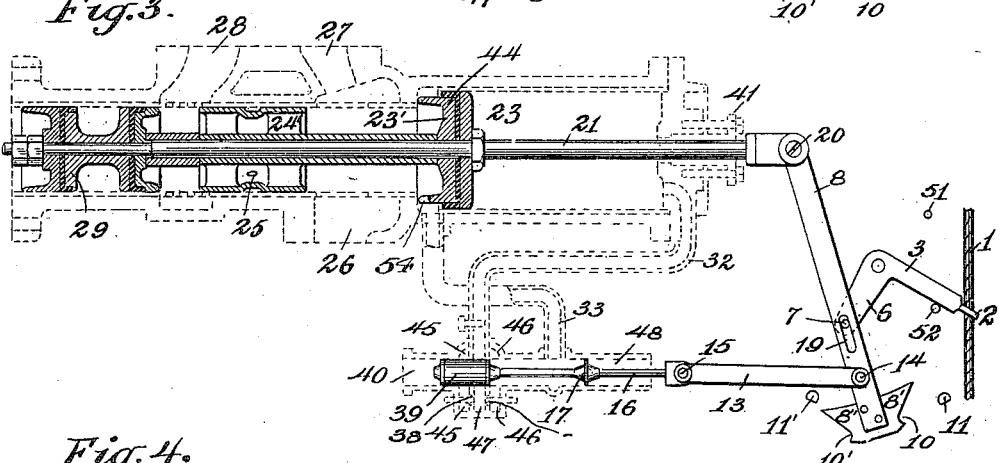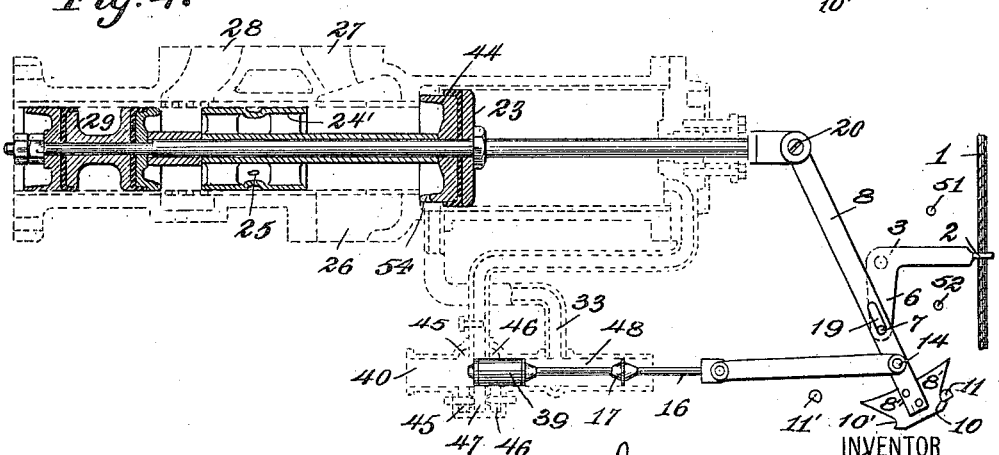

I. H. VENN.
VALVE CONTROLLING DEVICE.
APPLICATION FILED MAR. 21, 1905.
979,725.
Patented Dec. 27, 1910.
3 SHEETS—SHEET 3.
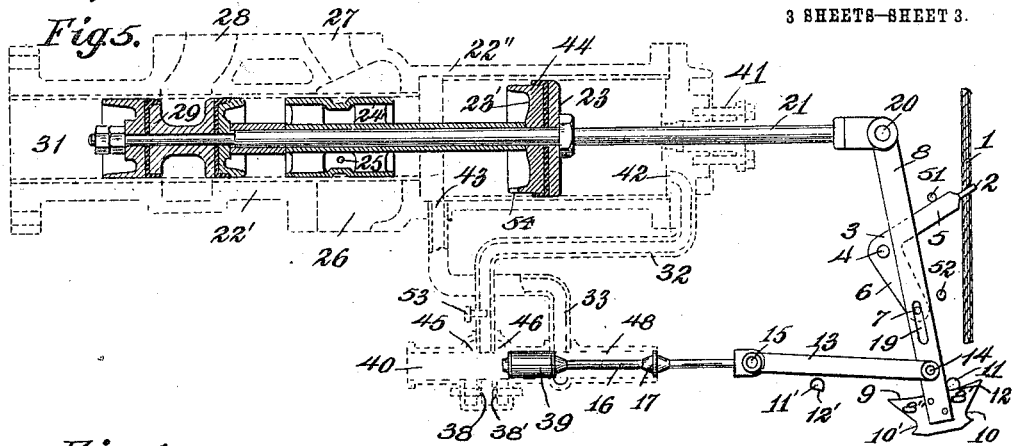
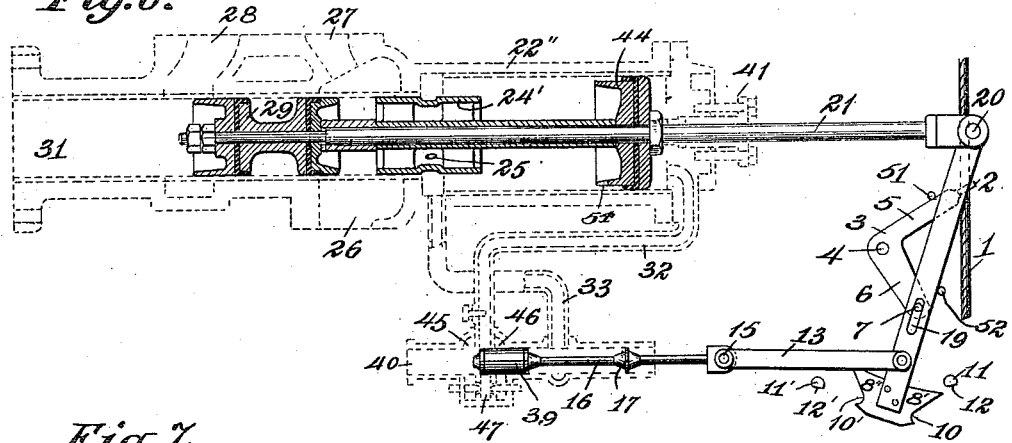
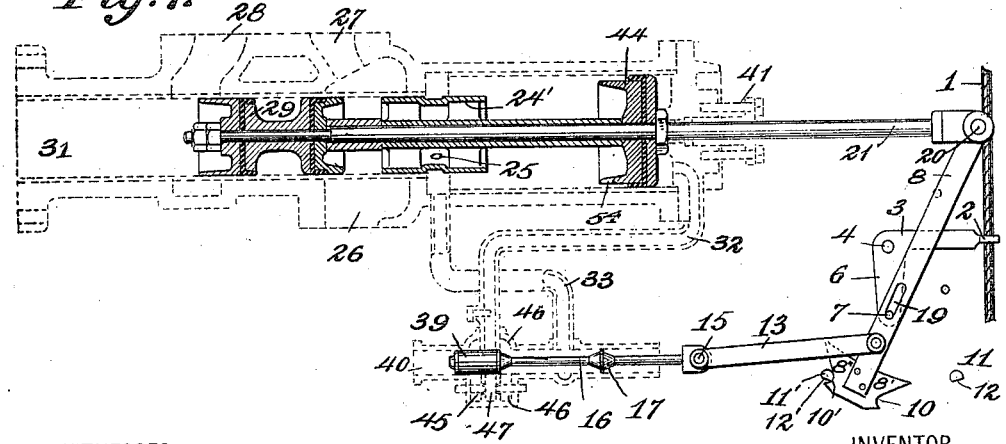
WITNESSES:
Charles M. Nissen
Walter C. Strang
INVENTOR
Isaac H. Venn
BY
Brown & Darby
ATTORNEYS

UNITED STATES PATENT OFFICE.

ISAAC H. VENN, OF YONKERS, NEW YORK, ASSIGNOR TO OTIS ELEVATOR COMPANY, OF EAST ORANGE, NEW JERSEY, A CORPORATION OF NEW JERSEY.

VALVE-CONTROLLING DEVICE.

979,725.  Specification of Letters Patent.  Patented Dec. 27, 1910.

Application filed March 21, 1905. Serial No. 251,257.

*To all whom it may concern:*

Be it known that I, ISAAC H. VENN, a citizen of the United States, residing at Yonkers, in the county of Westchester and State of New York, have invented a new and useful Improvement in Valve-Controlling Devices, of which the following is a specification.

My invention relates to improvements in means for controlling a valve, and more particularly a valve used in connection with hydraulic machinery, such as hydraulic elevators.

One of the objects of my invention is to provide a pilot valve of improved and simplified construction in connection with a main valve so that said pilot valve shall operate to effect the opening of the main valve quickly when the machinery controlled by said main valve is started so as to have maximum efficiency.

A further object of the invention is to provide a pilot valve of improved and simplified construction to effect a slow closing of the main valve.

Another object is to provide a pilot valve to prevent sudden shocks or jars in the operation of the main valve.

A further object is to provide an operating device and improved means in connection therewith for allowing said device to be moved to either up or down position only when the main valve is in substantially normal position.

Although my invention is shown applied to the main valve of a hydraulic elevator, it should be understood that it may have a general application. The main valve herein shown is of the differential type, and *per se*, forms no part of my invention, and, therefore, is herein not specifically claimed. Although a main valve similar to that disclosed in the patent to I. H. Venn and R. C. Smith, No. 414,610, granted November 5, 1889, for an improvement in hydraulic valve apparatus, is shown in the accompanying drawings, this is done merely by way of illustrating the application of the invention. Any main valve to which the invention is adapted may obviously be used.

Referring to the drawings, Figure 1 is a view mostly in longitudinal section and illustrates my invention when the parts are in their normal positions; Fig. 1ª is a vertical elevation on the line *a—a* of Fig. 1, illustrating a wall or parts of the pilot valve mechanism and showing a comparatively large opening through which the pilot valve moves, and also a restricted passage; Fig. 1ᵇ is a cross-sectional view of the main valve through the ports 26 and 27; Figs. 2 to 7, inclusive, are views similar to Fig. 1, but mostly diagrammatic and showing the relative positions of parts after receiving a definite motion, all as hereinafter fully set forth.

My invention is illustrated in the drawings as applied to a hydraulic elevator of which 1 represents the rope or cable passing through the car, which rope is to be moved up or down by the operator. Obviously this rope may be actuated from within the car in any desired manner, as for instance, by means of a lever, in which instance the operating rope would not need to pass through the car. To this cable at 2 is securely fastened the arm 5 of a bell-crank lever 3 pivoted at the fixed point 4. The arm 6 of this lever is shown in vertical position in Fig. 1 substantially at right angles to the arm 5, and is provided at its lower end with the pin 7 projecting laterally therefrom and arranged to slide in the slot 19. This slot extends longitudinally in the swinging arm 8 and permits free movement of the lever 3.

At the extreme lower end of the arm 8 are secured two symmetrical lugs 8′, 8″ shown in the drawings integral with each other. These lugs are shown provided with curved cutaway portions or heels 10, 10′ which are arranged to strike against the fixed stops 11, 11′ at certain times in the operation of the arm 8. These stops are provided with flat faces 12, 12′ so that when the arm 8 is rocked in either direction from its central position as shown in Fig. 1, the surface 9 may make contact with one of said faces or pass along the lower side thereof until limiting position is reached. The arm 8 is so connected to the main valve apparatus and the pilot valve mechanism that the stops do not prevent the arm 8 from swinging to its limiting positions when the main valve is substantially in its central position. The position of the faces 12, 12′ may be determined by the arc of a circle with the pivotal point 20 as its center when the parts are in their normal positions. The lugs 8′, 8″ comprising the heels 10, 10′ are of such a shape and arranged with relation to the stops 11, 11′ so that whenever it is attempted to move the operating lever past the central position when the main valve is not in central position, the result would be that such operating lever could be moved no farther than its central position until the main valve again comes to its central position.

The main valve apparatus will be described only in so far as is necessary to make clear the operations of the novel features connected thereto. The said main valve apparatus comprises a valve chest 22', a piston valve 29, and a cylinder or throttle valve 24'. The piston valve 29 is rigidly attached to a rod 21 and controls the communication between the port 28 and the discharge outlet or exhaust port 31; and also the communication between the supply inlet 26 and said port 28.

Connected with the main valves is a motor comprising a motor-cylinder 22'' and a motor piston 44. The motor piston is securely attached to the piston rod 21 but is of larger diameter than the piston valve 29, and when the piston valve 29 closes the port 28 it is at about the middle portion of the motor-cylinder 22'', (see Fig. 1.)

Between the aforesaid pistons and in proper relation thereto is placed the cylinder valve 24' which is secured rigidly to the rod 21 by means of spokes or a spider 24 at each end of said cylinder valve. This cylinder valve is for the purpose of shutting off the connection between the supply inlet 26 and the port 27 when the parts are in their normal positions, and to allow motor-fluid to flow from the inlet or supply port 26 to the port 28 when desired, or to the port 27. It is obvious that if the valve 24' is moved to the right, the fluid may flow from the inlet port 26 directly across the valve chest 22' to the port 27, and if the valve 24' is moved a sufficient distance to the left, the motor-fluid may flow to the port 28 through the cylinder valve and also to the port 27 directly across the valve chest, or in any other desired manner depending upon the type of main valve apparatus used.

The cylinder valve 24' is supplied with perforations 25 in a side toward the supply inlet 26 so that when the parts are in the positions shown in Fig. 1, a pressure may be exerted on the piston 44 to become effective when the pilot valve is moved from its normal position.

When the main valve 24' shown in Fig. 1 is used in connection with an elevator employing a vertical cylinder, the port 27 may lead to a circulating pipe extending to the upper end of said cylinder above the motor-piston therein, and the port 28 may be connected so as to communicate with the lower portion of said cylinder below the said piston in a manner well known to those skilled in the art. Although the apparatus disclosed in the patent hereinbefore referred to shows clearly how my invention may be applied to an elevator of the vertical cylinder type, it is obvious that it may be employed in connection with other types, as, for example, the horizontal cylinder type, or in connection with a plunger type whether direct acting or not. In the case of a direct acting plunger elevator the opening 27 is suitably closed so as to be water tight.

At the extreme ends of the valve motor cylinder 22'' are openings 42, 43 to which are connected the pipes 32, 33, respectively, these pipes being connected in turn, respectively, to the pilot valve chamber 47 and to the pilot valve piston cylinder or casing 48. The casing 48 has an enlarged portion provided with perforated partitions which form the chambers 45, 46 and 47. Communication is established between the chamber 47 and additional chambers 45, 46 through contracted or restricted openings or passages 38, 38'. The sizes of the openings between the chamber 47 and the chambers 45, 46 are regulated by means of screws 37, 37' passing through openings in the valve casing 34 and in line with the openings 38, 38'. The pipe 32 is provided with adjustable means for regulating the flow therein, this means being represented in Fig. 1 as a screw 53. The pipe 32 may be integral with the walls of the chamber 47 or I may make the pipe 32 of a separate piece and fasten the same to the pilot valve mechanism in any suitable manner. Arranged to move through said chambers, 45, 46 and 47 toward the pilot valve exhaust port 40, or in the opposite direction along the cylinder 48, is the pilot valve 39 shown in the shape of a piston. This pilot valve is preferably of such a length as to entirely close the communication of said chambers with the piston cylinder 48 and the exhaust port 40 when the parts are in the positions shown in Fig. 1. The piston valve 39 is connected by a rod 16 to an additional but comparatively short balancing piston 17 which also moves in the cylinder 48, but is so placed relatively to the piston 39 that at all times the pipe 33 opens into the cylinder 48 between said pistons, that is, the piston 17 is never moved so far to the left that the pipe 33 is allowed to open into the cylinder 48 to the right of the piston 17.

The rod 16 extends a short distance to the right from the piston 17 and is pivoted at 15 to a link 13, said link being pivoted at 14 to the lower end of the swinging arm 8. The upper end of the arm 8 is pivoted at 20 to the outer end of the valve stem 21 which extends to the right from the motor piston 44 through the cylinder head 41, as viewed in Fig. 1.

The operation of the apparatus is as follows: Assuming that all pistons are in their mid positions as shown in Fig. 1 and the main valve ports 27, 28 connected, respectively, above and below the piston in a vertical cylinder of a hydraulic elevator, for example, let it be desired to allow the car to descend. The operator in the car by means of the rope 1 will move the operating lever 3 so that the arm 6 moves toward the left carrying with it the pin 7 which moves in the slot 19. The arm 8 will be swung toward the left and this will cause the pilot valve 39 to move to its extreme left-hand position by reason of the connection of the link 13 to the arm 8 at 14 and to the piston rod 16 at 15. The surface 9 of the locking device passes under or makes contact with the face 12' of the left-hand stop 11' until the arm 8 strikes the stop 11' when the parts will take the positions of Fig. 2.

As shown in Fig. 2, the cylinder or throttle valve 24' and the piston valve 29 of the main valve apparatus at this time close the openings 27 and 28, respectively, but pressure can still be exerted from the supply inlet 26 through the perforations 25 on the piston valve 29 and on both sides of the piston 44. The pressure on the right-hand face of the piston 29 is overbalanced by the pressure on the left-hand face 23' of piston 44. The pressure on the right-hand face 23 of the piston 44 overbalances the excess pressure on the face 23' and consequently the main valves are moved to the left. Inasmuch as the pilot valve is wide open at this time, the water can flow freely at a maximum rate of speed to and through the pipes 33 and 32 into the motor cylinder at the right of the motor piston 44. It will, therefore, be seen that the main valves will be moved quickly, the quick movement toward the left being continued until just before the limiting position shown in Fig. 3 is reached. This movement, however, may be regulated by the screw plug 53.

When the parts are in the positions shown in Fig. 3, the port 27 is in direct communication with the port 28 through the cylinder valve 24', and the supply pressure will have little or no effect on the elevator system. The car can then descend by reason of its own load, having been allowed to start quickly, the water circulating from above the elevator piston through the circulating pipe, port 27, valve 24', and thence through port 28 to the space beneath the elevator piston; the water from the supply inlet making up for the loss due to the varying displacement by the elevator motor piston rods attached to said piston on the upper side. An important feature of my invention is that when the main valve is thus opened quickly, it will be retarded just before it reaches its limiting positions shown in Figs. 3 and 6. This is made clear in Fig. 3 where it will be seen that when the motor piston 44 moves toward the left, the piston rod 21 swings the arm 8 about the pin 7 as a fulcrum, the lever 3 remaining stationary against the stop 52. Therefore, since the piston rod 16 is connected to the arm 8 through the link 13, below the fulcrum 7, the pilot valve 39 will be moved toward the right, tending to close the connection between pipes 33 and 32 with the exception of the small opening or restricted passage. The communication between the pipes 33 and 32 is practically wide open until just before the piston 44 strikes against the motor cylinder head or valve chest, when the piston 39 closes the large opening between the chamber 47 and the pilot piston cylinder 48, but leaves the pipes 33 and 32 still in communication through a contracted or restricted opening 38'. The piston 44 is then checked or retarded in its quick movement so that it shall move slowly just before being brought to a stop by striking against the annular shoulder 50, as shown in Fig. 3. In other words, there is a cushioning of the motor piston 44 at the limits of its strokes as the water must now flow through the restricted passage 38'. It is evident that this retardation or cushioning may be regulated by the screw plug 37. Furthermore, a cutaway portion 54 is provided in the piston 44 so that after the main valve has been moved to supply position, or to the left as shown in Fig. 3, pressure will still be exerted on both sides of the piston 44, and the unbalanced pressure on the piston 44 retained to maintain the main valves in fully open position until the pilot valve is moved to the position shown in Fig. 4.

Now by an inspection of Fig. 4 it will be seen that the lever 3 cannot be moved by the rope 1 beyond its central position, for when this is attempted the heel 10 of the lug 8' strikes against the limit stop 11. When the lever 3 is moved from its position shown in Fig. 3 to that shown in Fig. 4, the arm 8 will be swung about 20 as a fulcrum by the pin 7 sliding in the slot 19 until the heel 10 strikes the stop 11. When the operating lever is moved from the position shown in Fig. 3 to that shown in Fig. 4, the motor cylinder 22 is opened to the right of the piston 44 to the exhaust port 40, through the opening 42, the pipe 32, and the restricted passage 38, and the pipe 33 is closed to the chambers 46 and 47. The pilot valve 39 in Fig. 4 has been moved to such a position that pressure through the pipe 33 can have no effect on the piston 44 as it exerts pressure only on the left hand side of the balancing piston 17 and on the right-hand end of the valve 39. The pilot valve 39 although closing connection of the chamber 47 directly with the exhaust port 40, allows water to flow from the right-hand side of the piston 44, to and through the chamber 47, and contracted opening 38 and chamber 45, to the pilot exhaust port 40. Pressure is now exerted, of course, on the left of the motor-piston 44 to gradually or slowly move the main valves to closed position to close the passage between the inlet port 26 and the circulating pipe. This movement may be regulated by the screw plug 37'. It is, therefore, seen, that by reason of the arrangement of parts as described, the elevator must stop slowly, and that the operating lever cannot be moved from one extreme to the other unless the main valve is in substantially central position.

Starting again with the parts as shown in Fig. 1, let the rope be moved upwardly preparatory to effecting the lifting of the car. The arm 6 of the operating lever 3 will be moved toward the right, swinging the arm 8 in the same direction until the arm 5 strikes the stop 51. The distance between the pivotal point 20 and the pin 7 is now substantially a minimum, so that the arm 8 and consequently the pilot valve 39 connected indirectly thereto, will be moved quickly to open wide the connection 32 to the pilot exhaust port 40, as shown in Fig. 5. The pressure in the pipe 33 has no effect at this time, but the unbalanced pressure on the left-hand side 23' of the motor piston 44 will cause said piston to move toward the right, forcing the water to the right thereof through the pipe 32 past the regulating plug 53 directly to the exhaust port 40. The piston 44 will, therefore, move with the maximum speed to open the main valve port 28 directly into the exhaust port 31, and the supply inlet 26 to the main valve port 27. This is clearly shown in Fig. 6. While the motor piston 44 is thus moved from its central position to its right-hand position, its connection with the piston rod 16 will cause the pilot valve 39 to close the communication between the pipe 32 and the exhaust port 40 with the exception of the contracted opening 38. This closing of the wide open passage from the pipe 32 through the left-hand wall of the chamber 47 of the exhaust port 40 occurs just before the piston 44 reaches the end of its stroke. Thus as stated in connection with Fig. 3, the motor-piston will be checked or retarded in its movement before it is stopped by striking against the motor cylinder head or stuffing box 41, thus preventing any sudden shocks or jars, and decreasing the noise of the valve when operating. This retardation may be regulated by the screw plug 37'.

The parts having taken the positions shown in Fig. 6, the lever 3 is moved to normal position just before the car reaches the top or any desired floor lever in its upward travel. But it is obvious from an inspection of Fig. 7 that the operating lever cannot be moved past central position for the reason that the heel 10' is brought into engagement with the limit stop 11' and thus any further movement is prevented. Not until the main valve actuating piston 44 has reached central position due to the heels 10, 10' of the lugs 8', 8'' assuming such a position that they will now strike against the stops 11, 11' when it is attempted to move the arm 8 to the right or to the left, can the lever 3 be moved beyond its central position.

When the operating lever 3 has been moved to central position for stopping, as shown in Fig. 7, the pilot valve 39 is moved toward the left, but not so as to entirely open the communication between the pipes 32 and 33, the piston being moved to allow water to flow through the contracted opening 38, the size of which may be varied by the screw plug 37. When the parts are in the positions shown in Fig. 7, fluid pressure will be exerted on the right-hand face 23 of the motor-piston 44 through the pipe 33, restricted passage 38', chamber 47, pipe 32 and opening 42. The unbalanced pressure on the piston 44 now causes the main valve 24' or the main valves 29, 24' to move toward the left. This action effects the gradual closure of the valve port 27, and, therefore, gradually restricts the flow of fluid to the elevator cylinder above its piston and also gradually restricts the flow of motor-fluid from beneath the elevator motor piston through the port 28 and exhaust port 31. This movement of the motor piston 44 is comparatively slow for the reason that the water can pass from the pipe 33 to the pipe 32 only through the restricted or contracted opening 38'. Of course during this movement the piston 39 gradually closes communication between the chamber 46 and the pipe 33, and finally the pistons again reach their central positions when the elevator car is at the top of the hoistway. Thus a complete cycle of operations of the main valve apparatus and pilot valve mechanism has been made.

I will now describe briefly the operation of my invention when used in connection with a plunger elevator system. In this case the valve port 27 is entirely closed to the supply, but the port 28 is kept open to the elevator cylinder in which the plunger moves. Assume again that the parts are in the position shown in Fig. 1 and it is desired to effect the lifting of the elevator car. The operating lever if moved to the position shown in Fig. 2, will effect the movement of the cylinder valve 24' and the piston valve 29 to the position shown in Fig. 3. Pressure can now be exerted from the supply inlet 26 through the cylinder 24' to the elevator plunger cylinder, and there to act on the plunger to lift the car. On stopping the parts will again take the positions shown in Fig. 1, of course, but if it is desired that the car shall descend, it is made to do so by moving the operating lever to the position shown in Fig. 5, when the parts will take the positions shown in Fig. 6. The valve port 28 is now wide open from the elevator cylinder to the exhaust port 31, and the car and plunger can descend by reason of their own weight.

It will be seen by following the movements illustrated in the various figures, that also in connection with a plunger elevator the valve will be opened quickly on starting and closed slowly on stopping, and that when the valve is opened quickly it will be gradually retarded in its quick movement just before the valve motor piston reaches either of its limiting positions. It will also be seen that by the use of this main valve apparatus when a change is made from a hydraulic elevator system comprising a circulating pipe, to a plunger elevator system, only port 27 need be closed, and in such event, the cylinder 24' could be omitted, if desired, and the valve 29 alone be depended upon for opening and closing the passage between the supply port 26 and the plunger cylinder, and between the latter and the exhaust port 31. It should also be noted that the pilot valve 39 is of extremely simplified construction in that it is embodied in a single device co-acting with enlarged and restricted passages to accomplish the objects of the invention.

It should be noted that the quick starting of the main valve is augmented by the leverage connections. This may be seen by following the movements of the pilot valve under various conditions. In the first place when the lever 3 is moved from the position of Fig. 1 to the position of Fig. 2, all three chambers, 45, 47 and 46 are widely opened and the pilot valve moves a distance equal to about its own length. The same is true if the lever 3 is moved to the position of Fig. 5. In either case the pin 7 occupies a position near the upper end of the slot 19, sufficient space being left above the said pin to prevent binding when the lever 8 is moved past vertical position from Fig. 2 to Fig. 3, or from Fig. 5 to Fig. 6. Now, under the above conditions the main valves are closed, the distance between the pin 7 and the fulcrum point 20 is at a minimum, and when the arm 3 is moved, the pin 7 travels in an arc nearly parallel to the straight line movement of the pilot valve 39. After the main valve apparatus has operated to open position, as indicated in Fig. 3 or Fig. 6, and it is desired to move the pilot valve to its proper position to effect the closing of the main valves, the lever 3 is moved from the position of Fig. 3 to that of Fig. 4, or from that of Fig. 6 to that of Fig. 7. As shown in Fig. 7, movement of the lever 3 is limited by the pin 7 striking the lower end of the slot 19, irrespective of the stop 11'. This is also true in the movement of the lever 3 from the position of Fig. 3 to that of Fig. 4. Furthermore, as the lever 3 is moved toward central position from either extreme position, the leverage varies by reason of the pin 7 sliding along the slot 19 to the lower end thereof, and consequently the valve 39 has a shorter length of travel. For instance; from Fig. 3 to Fig. 4, the valve 39 moves about two-thirds its length; so also from Fig. 6 to Fig. 7, whereas from Fig. 1 to Fig. 2 or Fig. 5, the valve 39 travels its entire length. Now, if the operating rope is actuated in about the same time in starting as in stopping, the pilot valve movement itself will assist in effecting a quick opening and a slow closing of the main valves.

Let it be assumed, merely by way of illustration, that the lever 3 is moved uniformly from the central position to one of its extreme positions in about three seconds. At once and during the first second the fluid flows through a restricted port. At the beginning of the second second the center chamber is gradually opened wide, and during the latter part of the second second the fluid flows freely, and the movement of the pilot valve during the third second has no effect. When the lever 3 is moved uniformly in three seconds to central position to effect the operation of the main valve apparatus to closed position, the movement during the first second and a half has no effect, and it is not until the beginning of the second second and a half that fluid passes through one of the restricted ports. During the latter part of this second portion of the time the fluid is free to pass through only the restricted passage. It is therefore evident that in actuating the pilot valve to effect the opening of the main valve, the latter is immediately moved and pressure on the motor piston 44 gradually increased until such pressure reaches maximum value, just after the pilot valve has moved two-thirds of the distance of its travel; and that in actuating the pilot valve to effect the closing of the main valve, pressure is not exerted on said piston during the first half of the movement of the pilot valve, and then the fluid is permitted to gradually pass through the pilot valve mechanism, including one of the restricted passages, and during the latter half of the movement the flow is directly through such restricted passage only.

By reason of the screw plug 53 the rate of flow of fluid in the pipe 32 may be regulated, and may even be so adjusted that the opening of the main valve may be at the same or less rate of speed than the closing thereof, although it is preferred that the main valve shall open more quickly than it closes. It is also evident that the plugs 37 and 37' are independent of each other, and that therefore the rate of closing the main valve in one direction may be regulated independently of the closing thereof in the other direction. That is to say, the rate of closing the main valve when the car is going up may be made greater or less than the rate of closing the main valve when the car is coming down, or vice versa.

I have described my invention in connection with hydraulic elevators, but evidently it may be used with other machinery operated by fluid pressure, if desired.

Obviously, those skilled in the art may make various changes in the details and arrangement of parts, without departing from the spirit and scope of my invention, and I desire therefore, not to be limited to the precise construction herein disclosed.

What I claim is:—

1. The combination with a valve, an actuating device therefor, a single pilot valve, and means co-acting with said single pilot valve for effecting the retardation of such actuating device near the limit of its stroke.

2. The combination with a main valve, of an actuating device therefor, a single pilot valve controlling such device, and means controlled by the pilot valve for retarding such device near the limit of its stroke.

3. The combination with a main valve, of a motor-piston, a single pilot valve, and means controlled by the pilot valve for restricting the escape of fluid near the outer limits of the stroke of such piston.

4. In an elevator, the combination with a main valve, of an actuating device rigidly secured thereto and in alinement therewith, a single pilot valve, and means co-acting with said pilot valve for retarding said actuating device near the limit of its stroke.

5. In an elevator, the combination with a main valve and a casing therefor, of a motor piston, a cylinder for said motor piston, a single pilot valve, a pilot valve casing, devices establishing communication between the pilot valve casing and the main valve casing and additional motor cylinder, and means to effect retardation of the motor piston near the limit of its stroke.

6. In an elevator, the combination with a main valve and a casing therefor of a motor piston, a cylinder therefor, a pilot valve, a pilot valve casing having a plurality of chambers coöperating with said pilot valve, devices establishing communication between said pilot valve casing and the main valve casing and motor cylinder, and means associated therewith for effecting the operation of the motor piston and the automatic retardation of the latter near the limit of its stroke.

7. In an elevator, the combination with a main valve and a casing therefor, of a motor-piston, a cylinder therefor, a pilot valve, a pilot valve casing having a plurality of chambers coöperating with said pilot valve, devices establishing communication between said pilot valve casing and the main valve casing and motor cylinder, and mechanism connecting the motor-piston and pilot valve to effect the automatic operation of the latter, said chambers and pilot valve being constructed and arranged to effect the retardation of the motor-piston near the limits of its stroke.

8. The combination with main valve apparatus, of an actuating device therefor, a single pilot valve arranged to control said actuating device, said pilot valve including balancing pistons, a pilot valve casing connected to said actuating device and having a plurality of chambers having enlarged and restricted passages coöperating with one of said pistons, and connecting mechanism between the actuating device and said pilot valve to effect the operation of the latter and the consequent retardation of a moving part of said actuating device near either limit of its stroke.

9. The combination with a main valve, of a motor comprising a cylinder and a piston, a single pilot valve, a pilot valve casing communicating with said motor and main valve, and means co-acting with said motor and single pilot valve and casing for restricting the flow of fluid through the latter near the limit of the stroke of the motor-piston.

10. The combination with a main valve, a motor therefor comprising a piston and a cylinder, a single pilot valve comprising balancing pistons, a pilot valve casing having a plurality of chambers for one of said pistons, a pipe connecting said motor cylinder at one side of the motor piston with said pilot valve casing, an additional pipe connecting said motor cylinder at the other side of said motor-piston and also said main valve with said pilot valve casing, and connecting mechanism between the motor and pilot valve, and arranged to be operated by said motor to actuate said pilot pistons to control the flow of fluid through said chambers.

11. The combination with a main valve, of a motor therefor, mechanism connected to said motor and having relatively free and restricted passages, and a single pilot valve for controlling the flow of fluid through said passages to effect the operation of said motor.

12. The combination with main valve apparatus, of a motor therefor comprising a piston and a cylinder, a single pilot valve, a single pilot valve casing in connection with said main valve apparatus and said motor cylinder, and having a plurality of chambers co-acting with said pilot valve, and connecting mechanism between the motor and pilot valve to effect the operation of said pilot valve to cause the latter to control the flow of fluid through said chambers to retard the motor-piston near the limits of its stroke and to maintain pressure on both sides of said motor-piston when the same is at one of the limits of its stroke.

13. The combination with main valve apparatus, of a motor therefor comprising a cylinder and a piston, pilot valve mechanism comprising a single piston valve, a balancing piston, and a casing having a plurality of chambers, said pilot valve casing being in communication with said motor cylinder and main valve apparatus, and means operated by said motor and acting upon said pilot valve to cause the same to control the flow of fluid to retard the motor-piston near either limit of its stroke and to stop the same at substantially the middle of its stroke.

14. The combination with a main valve, of a motor connected to said main valve and comprising a piston and a cylinder; pilot valve mechanism comprising balancing pistons and a casing having a plurality of chambers and an exhaust port; said pilot valve casing being normally in communication with said main valve and motor cylinder at one side of the piston in the latter from only between said balancing pistons, and said chambers being also at all times in communication with said motor cylinder to the other side of its piston, and means actuated by said motor for moving said balancing pistons to control the motor-piston and main valve.

15. The combination in an elevator with a main valve, of a motor therefor, a single pilot valve, a pilot valve casing communicating with said main valve and motor, and means co-acting directly with the pilot valve and motor to effect a quick opening and slow closing of the main valve.

16. The combination with a main valve, of a single secondary valve, and means co-acting directly with said secondary valve for opening said main valve quickly and closing the same slowly.

17. The combination with a main valve, of a motor therefor, a single pilot valve communicating with said main valve and motor, and means dependent upon the motor and said single pilot valve for effecting the opening of the main valve quickly and the closing of the same slowly.

18. The combination with a main valve, of an actuating piston therefor, a cylinder for said actuating piston, a single pilot valve, a pilot valve casing communicating with said main valve and motor cylinder, and means co-acting with said pilot valve and motor for opening the main valve quickly and closing the same slowly, and for retarding the actuating piston near the limit of its stroke.

19. The combination of a main valve, of a motor in alinement therewith, a pilot valve, and means dependent upon said motor and pilot valve for opening said main valve quickly and closing the same slowly.

20. The combination with a main valve, of a motor in alinement therewith, a single pilot valve, and means dependent upon said motor and single pilot valve for opening said main valve quickly and closing the same slowly.

21. The combination with a main valve, of an actuating device therefor rigidly connected thereto, a single pilot valve, and means dependent upon said actuating device and single pilot valve for opening the main valve quickly and closing the same slowly.

22. The combination with main valve apparatus comprising a piston valve and a cylinder valve, a motor-piston rigidly connected with said piston valve and cylinder valve, a cylinder for said motor-piston, a single pilot valve, a pilot valve casing communicating with said main valve apparatus and motor cylinder, and means co-acting with said motor-piston and single pilot valve for opening the main valve quickly and closing the same slowly.

23. The combination with a main valve, of a motor in alinement therewith, a single pilot valve in communication with said main valve and motor, a manually operable device for controlling said pilot valve, said valve and device being constructed and arranged to open the main valve quickly and close the same slowly.

24. The combination with a main valve and a motor, of a single pilot valve, a pilot valve casing communicating with said main valve and motor, mechanism for operating said pilot valve to fully open position when the main valve is in normal position, and means for restricting the movement of said pilot valve to a partially open position when the main valve is out of its normal position.

25. The combination with a change valve for controlling the passage of fluid under pressure, of a motor for opening and closing said valve, a single pilot valve, a pilot valve casing communicating with said valve and motor, and means co-acting directly with said motor and pilot valve for effecting a quick opening and slow closing of said change valve.

26. In a hydraulic elevator, the combination with a change valve, of a valve motor in alinement with said valve, a single pivot valve, a pilot valve casing in direct communication with said change valve and valve motor, and means co-acting directly with said motor and valve for effecting a quick opening and slow closing of said change valve.

27. In a hydraulic elevator, the combination with a change valve apparatus comprising a piston valve and a throttle valve, of a valve motor in alinement with said change valve and rigidly connected with said piston valve and throttle valve, a single pilot valve, a pilot valve casing in direct communication with said change valve apparatus and valve motor, and means co-acting with said motor and valve for effecting a quick opening and slow closing of the change valve.

28. The combination in a hydraulic elevator, with a main valve arranged to be closed when in its mid position, of motor means therefor, a single pilot valve, a pilot valve casing in direct communication with said main valve and motor means, and means co-acting with said motor means and directly with said pilot valve and casing to regulate the velocity of flow of fluid through said pilot valve mechanism to effect a quick opening and slow closing of the said main valve.

29. The combination with main valve apparatus for controlling the passage of fluid under pressure, of a motor for said valve, a single pilot valve, a pilot valve casing in communication with said main valve apparatus and motor, said pilot valve casing having enlarged and contracted fluid passages, and means operated by said motor for causing said pilot valve to control the flow of fluid through said passages.

30. The combination with main valve apparatus for controlling the passage of fluid under pressure, of a motor for said valve, a single pilot valve, a pilot valve casing in direct communication with said main valve apparatus and having chambers communicating with each other through enlarged and contracted passages, and means operated by said motor for actuating said pilot valve to control the flow of fluid through said passages to effect independent rates of speed of opening and closing of the main valve.

31. The combination in an elevator with change valve apparatus, of a motor for opening and closing said valve, a single pilot valve, a pilot valve casing in direct communication with said change valve and motor, said casing having enlarged and contracted fluid passages through which the fluid must flow when the main valve is moved, appliances for operating the pilot valve and means operated by said motor for actuating said pilot valve to cause the latter to control the flow of fluid through said passages to effect opening and closing of the main valve at independent rates of speed.

32. The combination with main valve apparatus, of a motor-piston therefor, a single pilot valve, a pilot valve casing in direct communication with said valve apparatus and motor, and having enlarged and restricted passages, means for operating said pilot valve to open said passages to the flow of fluid to effect a quick opening of the main valve, and means co-acting with said operating means and with the motor for automatically actuating said pilot valve to vary the flow of fluid through said passages and effect a retardation of said motor-piston near the limit of its movement.

33. The combination with a valve, of a casing therefor, an actuating device for said valve, a cylinder for said actuating device, a single pilot valve, a pilot valve casing in direct communication with said first-named valve casing and cylinder, said pilot valve casing having enlarged and contracted fluid passages, and means operated by said actuating device to move the pilot valve to alternately close said enlarged passages upon different movements of the main valve, the flow of fluid through the pilot valve casing being restricted to said contracted passages when the enlarged passages are closed.

34. The combination with an elevator valve arranged to be closed when in an intermediate position and opened when moved in either direction from said position, of a valve actuating member rigidly connected to said valve for operating the same, a single pilot valve, a pilot valve casing in direct communication with said elevator valve, and means co-acting directly with said pilot valve for permitting comparatively free movements of said actuating member in either direction from an intermediate position, and for correspondingly restricting the speed at which said actuating member may be returned from either extreme position.

35. The combination with a valve and a motor, of a single secondary valve communicating directly with said first-named valve and motor, and means for opening the secondary valve, said means being capable of opening the secondary valve in either direction only partially when the first-named valve is out of its closed position.

36. The combination with a main valve, of a motor for said valve, a pilot valve, a pilot valve casing communicating with said main valve and motor, said pilot valve casing being provided with enlarged and contracted passages, and means coöperating with said motor for permitting the enlarged passages to be opened only when the main valve is in closed position.

37. The combination with a main valve, of a motor therefor, a single auxiliary valve, a casing for said auxiliary valve communicating directly with said main valve and motor, said auxiliary valve casing having chambers provided with enlarged and contracted openings, and means for permitting said auxiliary valve to be opened only through said enlarged openings when the main valve is in one position, and through only one of said contracted openings when the main valve is in another position.

38. In a hydraulic elevator, the combination with a main valve, an actuating piston therefor, a cylinder for said actuating piston, a pilot valve, a pilot valve casing connected to said main valve and actuating piston cylinder, said pilot valve casing having a plurality of chambers provided with enlarged fluid passages and adjustable contracted fluid passages, operative means when said valve is open for allowing said pilot valve to be opened through only one of said contracted passages and for allowing said enlarged passages to be opened when said actuating piston is in substantially central position and the main valve closed.

39. In a valve, the combination with a valve casing provided with chambers, of partitions in an enlargement of said casing to constitute said chambers, said partitions being provided with small and larger openings, said small openings affording communication between said chambers, a piston arranged to be moved in said valve casing and through said large openings, and a second balancing piston connected to said first-named piston, an inlet port opening into the casing between said pistons, an outlet port communicating with one of said chambers, and an exhaust port.

40. In a valve, the combination with a valve casing provided with an inlet port, an exhaust port and an additional port; of partitions in an enlargement of said casing to constitute chambers, said chambers being in communication with said additional port, and said partitions having enlarged and contracted fluid passages; means for adjusting the sizes of said contracted passages, said contracted passages affording communication between said chambers; a controlling piston arranged to be moved in said valve casing and through said enlarged passages to regulate the flow of fluid through said ports; and a balancing piston for said controlling piston.

41. The combination with a valve, of a secondary valve connected thereto, mechanism comprising a lever connecting said valves, fixed stops in the path of said lever, and lugs on said lever arranged to engage said stops for preventing a reversal of the said secondary valve when the first-named valve is out of normal position.

42. The combination with a main valve, of actuating means therefor, a pilot valve connected to said main valve and actuating device, members comprising a swinging arm connecting said actuating device and said pilot valve, fixed stops adjacent to said members, lugs on said swinging arm, said stops being normally out of the path of movement of said lugs, but one of the stops being in the path of one of the lugs to prevent reversal of the pilot valve when the main valve is out of normal position, and an actuating device for said members to operate said pilot valve, thereby controlling said main valve and its actuating means.

43. The combination with a main valve, of an actuating device therefor, a pilot valve for controlling said device, a swinging arm pivotally connected to said actuating device, a link connecting the pilot valve to said swinging arm, an operating lever connected with said swinging arm by a variable pivot, fixed stops, lugs on said swinging arm, said stops being normally out of the path of said lugs, but one of said stops being in the path of one of said lugs when the main valve is out of normal position to prevent a reversal of the pilot valve.

44. The combination with a main valve, of a motor cylinder and piston therein, a pilot valve chamber and casing, and pilot valve, the said chamber being provided with two ports and adjustable plugs therefor for respectively regulating independently and variably the time of closing of the main valve, and connections or pipes between the cylinder and the chamber, and the cylinder and the casing.

45. The combination with a main valve, of a motor for actuating the same, a pilot valve and casing therefor, the pilot valve and casing being constructed and arranged to effect a quick opening and slow closing of the main valve, and means for regulating the rates of speed of said main valve to closed position.

46. The combination with a main valve and a motor, of a pilot valve, a pilot valve casing having enlarged and restricted passages, and independent devices for regulating the restricted passages.

47. The combination with a valve, of a motor therefor, controlling mechanism for said motor comprising a movable member, and means for imparting a predetermined movement to said member to effect the opening of the main valve and a lesser movement to effect the closing of the same.

48. The combination with a main valve, of a motor therefor, a pilot valve and connections between the same and said motor, appliances for moving the pilot valve to effect the actuation of the main valve, and connections for effecting only a partial return movement of the pilot valve as the main valve is actuated.

49. The combination with a main valve, of a motor therefor, a pilot valve, connections between the motor and pilot valve, and appliances for operating said pilot valve through a predetermined distance to effect the opening of the main valve and through a lesser distance to effect the closing of said main valve.

50. The combination with a main valve and a motor therefor, of controlling mechanism comprising a pilot valve, and connections effecting an automatic movement of said pilot valve through different distances during the opening and closing of the main valve.

51. The combination with a main valve, of a motor therefor, pilot valve mechanism for controlling said motor, and connections to effect a predetermined movement of the pilot valve during the opening of the main valve and a smaller movement of the pilot valve during the closing of the main valve.

52. The combination with a valve and a motor, of a pilot valve, and connections comprising a lever having a variable fulcrum to effect a greater automatic movement of the pilot valve during the opening of the main valve than during its closing.

53. The combination with a main valve, of a motor, a pilot valve, and manual operating mechanism comprising a lever having a variable fulcrum to effect a greater throw of the pilot valve to open the main valve than to close the same.

54. The combination with a main valve and a motor, of pilot valve mechanism, connections between said valves comprising a floating lever, and an operating device associated with said lever, and means for preventing the operating device from being moved past central position when the main valve is opened.

55. The combination with a main valve and a motor, of pilot valve mechanism, connections between said valves comprising a lever having a slot therein, and an operating device permanently engaging said lever in said slot and limited in its movement by the latter to prevent a throw thereof past central position.

In testimony whereof, I have signed my name to this specification in the presence of two subscribing witnesses.

ISAAC H. VENN.

Witnesses:
CHARLES M. NISSEN,
WALTER C. STRANG.